United States Patent
Sakata

(10) Patent No.: US 9,695,905 B2
(45) Date of Patent: Jul. 4, 2017

(54) BALANCE SHAFT HOUSING OF AN INTERNAL COMBUSTION ENGINE

(71) Applicant: Kunihiko Sakata, Nagakute (JP)

(72) Inventor: Kunihiko Sakata, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 62 days.

(21) Appl. No.: 14/437,326

(22) PCT Filed: Oct. 17, 2013

(86) PCT No.: PCT/IB2013/002542
§ 371 (c)(1),
(2) Date: Apr. 21, 2015

(87) PCT Pub. No.: WO2014/064523
PCT Pub. Date: May 1, 2014

(65) Prior Publication Data
US 2015/0292595 A1   Oct. 15, 2015

(30) Foreign Application Priority Data
Oct. 24, 2012   (JP) .................. 2012-234321

(51) Int. Cl.
*F16F 15/26*   (2006.01)
*F02F 7/00*   (2006.01)
*F02B 75/06*   (2006.01)

(52) U.S. Cl.
CPC ............ *F16F 15/267* (2013.01); *F02B 75/06* (2013.01); *F02F 7/0046* (2013.01); *F16F 15/264* (2013.01)

(58) Field of Classification Search
CPC ........ F16F 15/22; F16F 15/264; F16F 15/267; F02B 75/06; F02F 7/0046; F01M 1/06;
(Continued)

(56) References Cited

U.S. PATENT DOCUMENTS 6,752,117 B2 *   6/2004   Purcell ................... F01M 11/02
                                                    123/192.2
6,772,725 B2 *   8/2004   Inaba ..................... F01M 11/02
                                                    123/192.2
(Continued)

FOREIGN PATENT DOCUMENTS

JP   S58-160647 A   9/1983
JP   63-195446 A    8/1988
(Continued)

OTHER PUBLICATIONS

Feb. 27, 2014 International Search Report issued in International Patent Application No. PCT/IB2013/002542.

*Primary Examiner* — Grant Moubry
(74) *Attorney, Agent, or Firm* — Oliff PLC

(57) ABSTRACT

In an engine (internal combustion engine), a crankcase is provided with a fastening area that surrounds the opening and contacts the oil pan, a balance shaft housing is disposed in the crankcase to surround the opening, and four housing side fastening sections are provided to the crankcase to fasten the crankcase and the balance shaft housing. The fastening section of the four housing side fastening sections in a first axial direction side of a balance shaft is disposed on the inside of the fastening area, and the fastening section of the four housing side fastening sections in a second axial direction side of the balance shaft is disposed on the outside of the fastening area.

5 Claims, 8 Drawing Sheets

(58) Field of Classification Search
CPC .... F01M 11/00; F01M 2011/0008; F16C 3/20
USPC ............. 123/192.1, 192.2; 74/603, 604
See application file for complete search history.

(56) References Cited

U.S. PATENT DOCUMENTS

| | | | | |
|---|---|---|---|---|
| 7,434,560 B2* | 10/2008 | Ohsawa | ............... | F16F 15/265 |
| | | | | 123/192.2 |
| 7,631,629 B2* | 12/2009 | Terada | ............... | F01M 5/002 |
| | | | | 123/192.2 |
| 7,931,004 B2* | 4/2011 | Koyama | ............... | F02B 75/06 |
| | | | | 123/192.2 |
| 8,151,756 B2* | 4/2012 | Neal | ............... | F16F 15/265 |
| | | | | 123/192.2 |
| 2009/0050100 A1 | 2/2009 | Terada | | |

FOREIGN PATENT DOCUMENTS

| | | |
|---|---|---|
| JP | 2003-027956 A | 1/2003 |
| JP | 2006-329064 A | 12/2006 |
| JP | 2009-024515 A | 2/2009 |
| JP | 2012-007691 A | 1/2012 |

\* cited by examiner

BALANCE SHAFT HOUSING OF AN INTERNAL COMBUSTION ENGINE

BACKGROUND OF THE INVENTION

1. Field of the Invention

The present invention relates to an internal combustion engine and, in particular, relates to an internal combustion engine that includes a balance shaft housing that is disposed between a crankcase and an oil pan and provided with a balance shaft in a rotatable manner.

2. Description of Related Art

An internal combustion engine that includes a balance shaft housing disposed between a crankcase and an oil pan has been known (see Japanese Patent Application Publication No. 2012-007691 (JP 2012-007691 A), for example).

Generally, in a multi-cylinder internal combustion engine, when rotational imbalance of a crankshaft is caused by a secondary inertia force that is generated by a vertical reciprocating motion of a piston, this further causes vertical vibration of the internal combustion engine. Accordingly, the internal combustion engine is provided with a balancer device to suppress the vertical vibration.

The internal combustion engine that is disclosed in JP 2012-007691 A includes a crankcase, an oil pan that is fastened to a lower part of the crankcase, and a balancer device that is disposed between the crankcase and the oil pan.

The balancer device includes two balance shafts that are rotationally driven according to rotation of the crankshaft as well as an upper housing and a lower housing that house the balance shafts in a rotatable manner. Each of the balance shafts is configured such that the center of gravity thereof is deviated from the center of rotation thereof, and the vertical vibration and the like that are caused by the secondary inertia force of an engine can be suppressed by the rotation of the balance shafts.

Meanwhile, a relatively large opening has to be formed in a bottom surface of the crankcase in order to dispose an oil pump in the crankcase, install the balance shafts, and secure an amount of oil. The formation of the opening in the bottom surface of the crankcase causes twisting, bending, or the like of the crankcase itself. Consequently, rigidity of a power plant that is formed with the engine, a transmission, and the like is decreased.

In addition, due to a decrease in the rigidity of the power plant, vibration of an engine mount is increased, and consequently, the engine noise becomes louder. Meanwhile, in order to secure the rigidity of the power plant, it is considered to dispose a rib or the like in the rear (a side part where a speed changing mechanism such as the transmission is disposed) of the crankcase for reinforcement.

However, there is space limitation in the rear of the crankcase for disposing the rib or the like because a space for fastening a drive plate and the like of the transmission is necessary in the rear of the crankcase. In addition, if the rib and the like are disposed to reinforce the crankcase, it causes a disadvantage such as an increase in a mass of the crankcase.

SUMMARY OF THE INVENTION

The present invention provides an internal combustion engine by which rigidity of a power plant can be increased.

The internal combustion engine according to one aspect of the present invention includes an oil pan, a crankcase, and a balance shaft housing that is disposed between the crankcase and the oil pan and is provided with a balance shaft in a rotatable manner. The crankcase is formed with an opening that communicates between the crankcase and the oil pan and is provided with an oil pan side fastening area that contacts the oil pan. The balance shaft housing is disposed in the crankcase so as to cover the opening, and the crankcase is provided with plural housing side fastening sections that fasten the crankcase and the balance shaft housing. The fastening section of the plural housing side fastening sections in a first axial direction side of the balance shaft is disposed on the inside of the oil pan side fastening area, and the fastening section of the plural housing side fastening sections in the second axial direction side of the balance shaft is disposed on the outside of the oil pan side fastening area.

In the internal combustion engine according to the above aspect, because the balance shaft housing has a beam structure in the opening of the crankcase, it is possible to suppress twisting, bending, or the like of the crankcase that can be caused by the opening. In other words, because a margin of increase in a resonance frequency is increased (improved) in the power plant by optimally disposing the balance shaft housing, the rigidity of the power plant can be increased with an increase in the margin of increase in the resonance frequency. Therefore, it is possible to reduce vibrations of an engine mount and also reduce an engine noise. In addition, the rigidity of the power plant is increased by optimally disposing the balance shaft housing. Therefore, unlike a case where a rib or the like is disposed in the crankcase for reinforcement (increased rigidity), it is possible to suppress an increase in a mass of the crankcase.

In the internal combustion engine according to the above aspect, the oil pan side fastening area may be provided to have a shape to surround the opening of the crankcase, and the fastening section of the plural housing side fastening sections in the first axial direction side may be disposed on the inside of the oil pan side fastening area that has the shape to surround the opening while the fastening section of the plural housing side fastening sections in the second axial direction side may be disposed on the outside of the oil pan side fastening area that has the shape to surround the opening. It is possible with the above aspect to dispose the balance shaft housing in a manner to extend from the inside of the oil pan side fastening area (opening) to the outside thereof, and it is thus possible to suppress occurrence of twisting, bending, or the like of the opening. Therefore, the rigidity of the power plant can be increased.

In the internal combustion engine according to the above aspect, the fastening section of the plural housing side fastening section in the first axial direction side may be disposed on the inside of the oil pan side fastening area and in the vicinity of the oil pan side fastening area, and the fastening section of the plural housing side fastening sections in the second axial direction side may be disposed on the outside of the oil pan side fastening area and in the vicinity of the oil pan side fastening area.

In the internal combustion engine according to the above aspect, a speed changing mechanism may be disposed in the second axial direction side in the crankcase, and the fastening section of the plural housing side fastening sections in an opposite side from the second axial direction side where the speed changing mechanism is disposed may be disposed on the inside of the oil pan side fastening area while the fastening section of the plural housing side fastening sections in the second axial direction side where the speed changing mechanism is disposed may be disposed on the outside of the oil pan side fastening area. It is possible with such a configuration to increase the rigidity of the power plant while securing a space to fasten a drive plate and the like of the speed changing mechanism in an axial end side of the crankcase where the speed changing mechanism is disposed.

In the internal combustion engine according to the above aspect, the opening of the crankcase may be formed to extend from the vicinity of a center of the crankcase to an end of the crankcase in the first axial direction side. It is possible with such a configuration to increase the rigidity of the power plant by suppressing occurrence of twisting, bending, or the like of the opening that is formed to extend from the vicinity of the center of the crankcase to an end of the crankcase in the first axial direction side.

With the internal combustion engine according to the above aspect, the rigidity of the power plant can be increased.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A description will hereinafter be made on an embodiment of an internal combustion engine according to the present invention with reference to the accompanying drawings.

Figure 1:
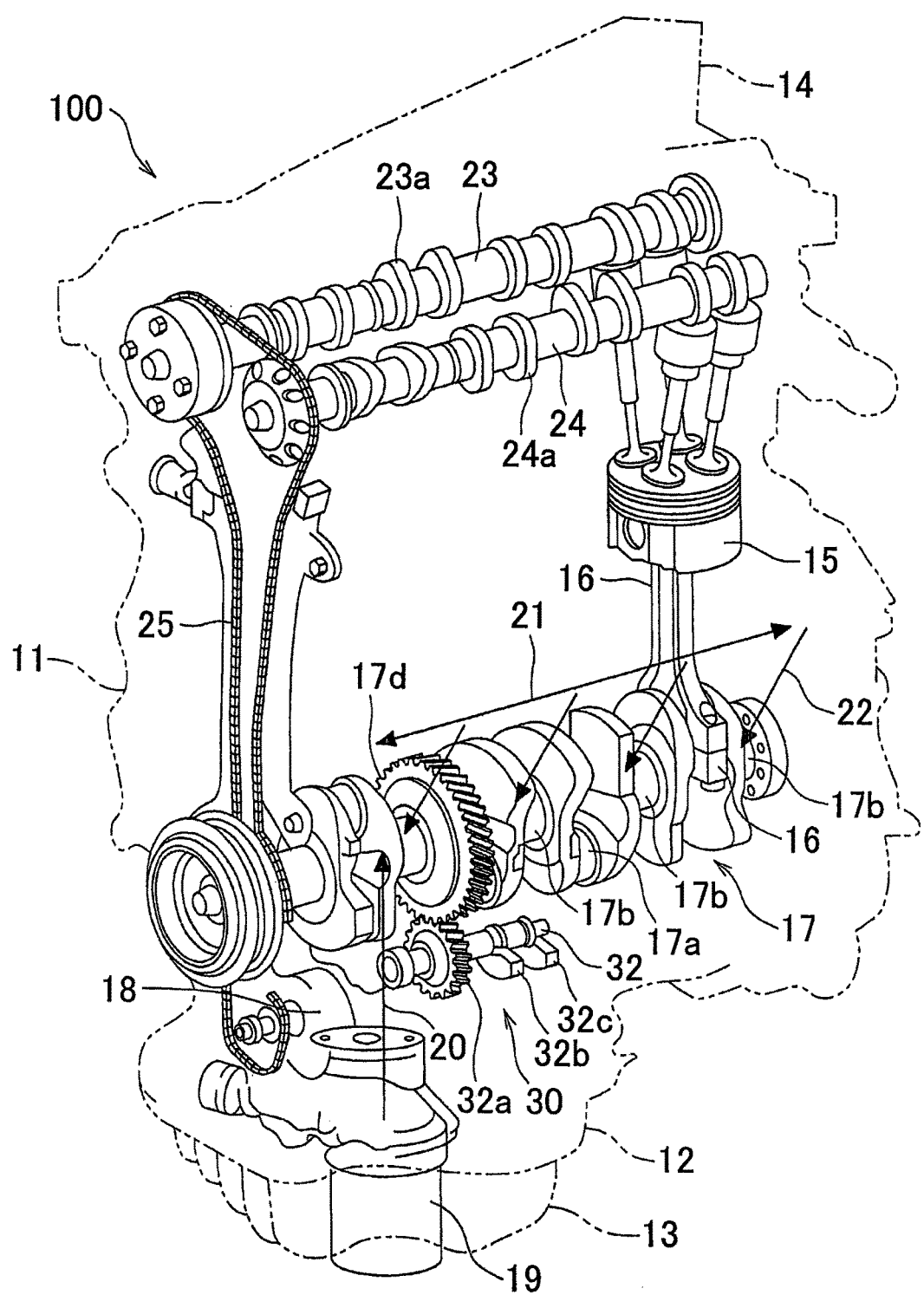
FIG. 1 is a view for showing a schematic configuration of an internal combustion engine according to an embodiment of the present invention.

As shown in FIG. 1, an engine 100 includes a cylinder block 11, a crankcase 12, an oil pan 13, and a cylinder head 14. The engine 100 is an example of an "internal combustion engine" according to the present invention. The crankcase 12 is attached to a lower part of the cylinder block 11. The oil pan 13 is attached to a lower part of the crankcase 12. The cylinder block 11 is provided with four cylinders (not shown), and a piston 15 is housed in each of the cylinders.

Each of the pistons 15 is coupled to a crank pin 17a of a crankshaft 17 via a connecting rod 16. The oil pan 13 for storing oil (engine oil) is mounted to the lower part of the crankcase 12 that houses the crankshaft 17.

An oil pump 18 is provided in the oil pan 13. The oil pump 18 sucks up the oil that is stored in the oil pan 13 through an oil strainer 19, and the oil is then supplied to a main gallery 21 that is provided in the cylinder block 11 via an oil supply passage 20.

Plural oil supply passages 22 are branched from the main gallery. 21, and the oil supply passages 22 respectively supply the oil that is introduced to the main gallery 21 to crank journals 17b of the crankshaft 17. Therefore, the crank journals 17b are lubricated by the oil that is supplied from the oil supply passages 22.

The oil supplied to the crank journal 17b is then supplied to a space between the connecting rod 16 and the crank pin 17a through a hole that is formed in a radial direction and an axial direction of the crankshaft 17.

The oil supplied to the main gallery 21 is also supplied to an intake cam 23a and an exhaust cam 24a that are housed in the cylinder head 14 as well as to a timing chain 25 that couples the crankshaft 17 to an intake camshaft 23 and an exhaust camshaft 24 that respectively support the intake cam 23a and the exhaust cam 24a in a rotatable manner.

Figure 2:
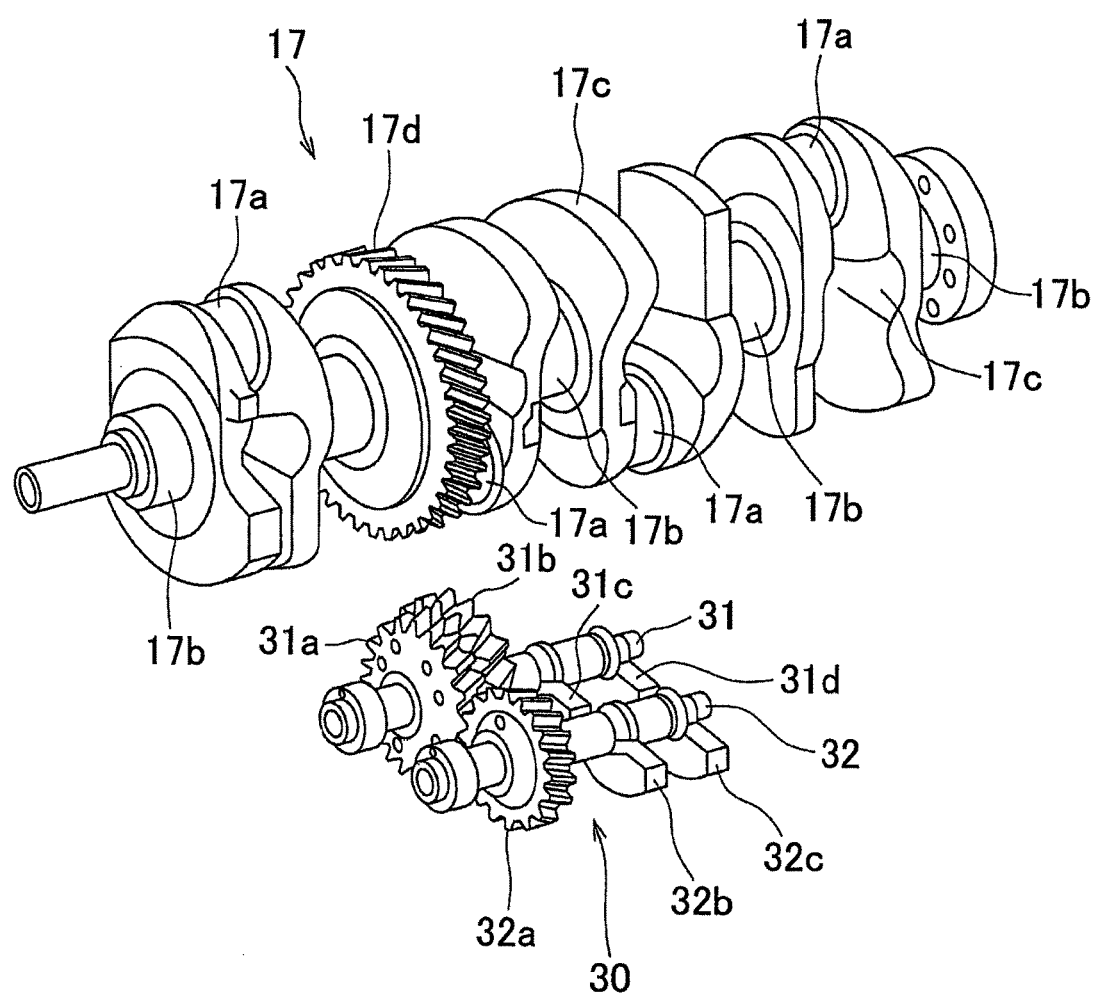
FIG. 2 is a perspective view of a balance shaft and a crankshaft.

As shown in FIG. 2, the crankshaft 17 includes counterweights 17c that respectively correspond to the four crank pins 17a and the crank journals 17b that are disposed on both axial sides of the crankshaft 17 and between the adjacent cylinders. The crankshaft 17 is rotatably supported by each of the crank journals 17b in the crankcase 12 side (see FIG. 1).

The counterweight 17c is formed to have a larger diameter than the crank pin 17a and the crank journal 17b and is provided between the crank pin 17a and the crank journal 17b of the crankshaft 17. In this embodiment, the counterweight 17c serves as a large-diameter rotary section while the crank pin 17a and the crank journal 17b serve as a shaft section.

As shown in FIG. 1, a balancer device 30 is provided between the crankcase 12 and the oil pan 13. As shown in FIG. 2, the balancer device 30 includes balance shafts 31, 32 that are rotationally driven according to the rotation of the crankshaft 17 and a balance shaft housing 33 that houses the balance shafts 31, 32 in the rotatable manner and that will be described later (see FIG. 3 and FIG. 7).

Driven gears 31a, 32a are respectively fixed to the balance shafts 31, 32. The driven gears 31a, 32a mesh with each other and have the same number of teeth. Therefore, the balance shafts 31, 32 rotate at a same speed in opposite directions from each other.

In addition, a driven gear 31b is fixed to the balance shaft 31. The driven gear 31b meshes with a drive gear 17d that is provided in the crankshaft 17. A ratio of the number of teeth between the drive gear 17d and the driven gear 31b is set to 2:1.

Accordingly, the balance shafts 31, 32 rotate at twice a rotational speed of the crankshaft 17. It should be noted that, instead of a gear driving method, a chain driving method, a belt driving method, or the like may be used as a method for transmitting the rotation of the crankshaft 17 to the balance shafts 31, 32.

The balance shafts 31, 32 respectively include balance weights 31c, 31d, 32b, 32c. Each of the balance weights 31c, 31d, 32b, 32c is formed in a semi-circular shape so that center of gravity thereof is deviated from an axis of either one of the balance shafts 31, 32. Accordingly, the balancer device 30 can suppress vertical vibration and a muffled sound that are caused by a second inertia force of the engine 100 by rotating the balance shafts 31, 32 whose centers of gravity are deviated from centers of rotation.

The balance weights 31c, 31d, 32b, 32c can also be formed separately from the balance shafts 31, 32 and fastened to the balance shafts 31, 32 by a bolt or the like for integral rotation with the balance shafts 31, 32.

Figure 7:
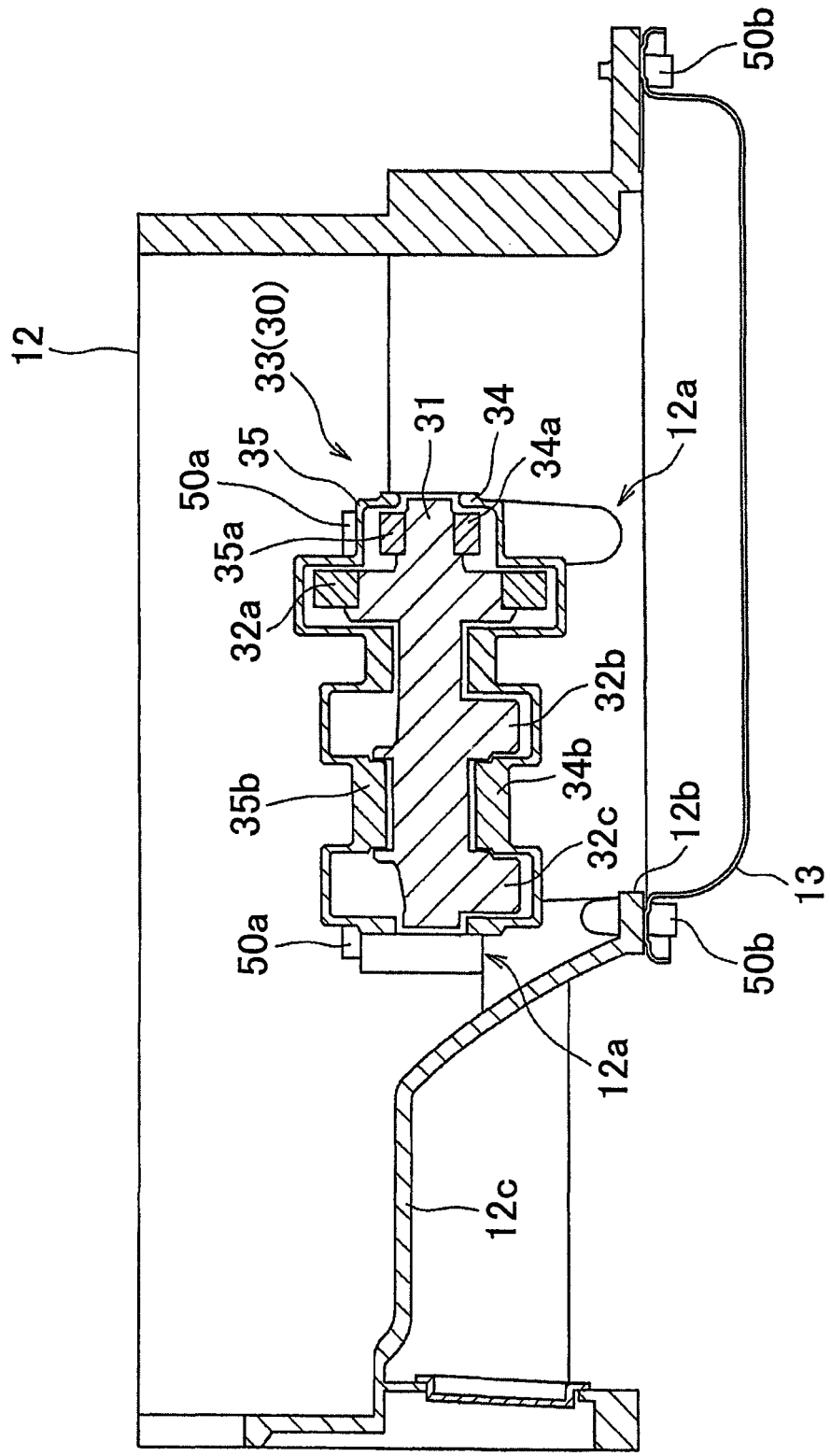
FIG. 7 is a cross-sectional view that is taken along the line VII-VII of FIG. 3.

As shown in FIG. 7, the balance shaft housing 33 includes a lower housing 34 and an upper housing 35. The lower housing 34 is fastened to the upper housing 35 by a bolt (not shown).

The lower housing 34 is formed with bearing sections 34a, 34b. The upper housing 35 is formed with bearing sections 35a, 35b. The balance shaft 31 is rotatably supported by the bearing sections 34a, 34b, 35a, 35b. Although the balance shaft 32 is not shown in FIG. 7, the balance shaft 32 is also rotatably supported by bearing sections like the balance shaft 31.

Figure 3:
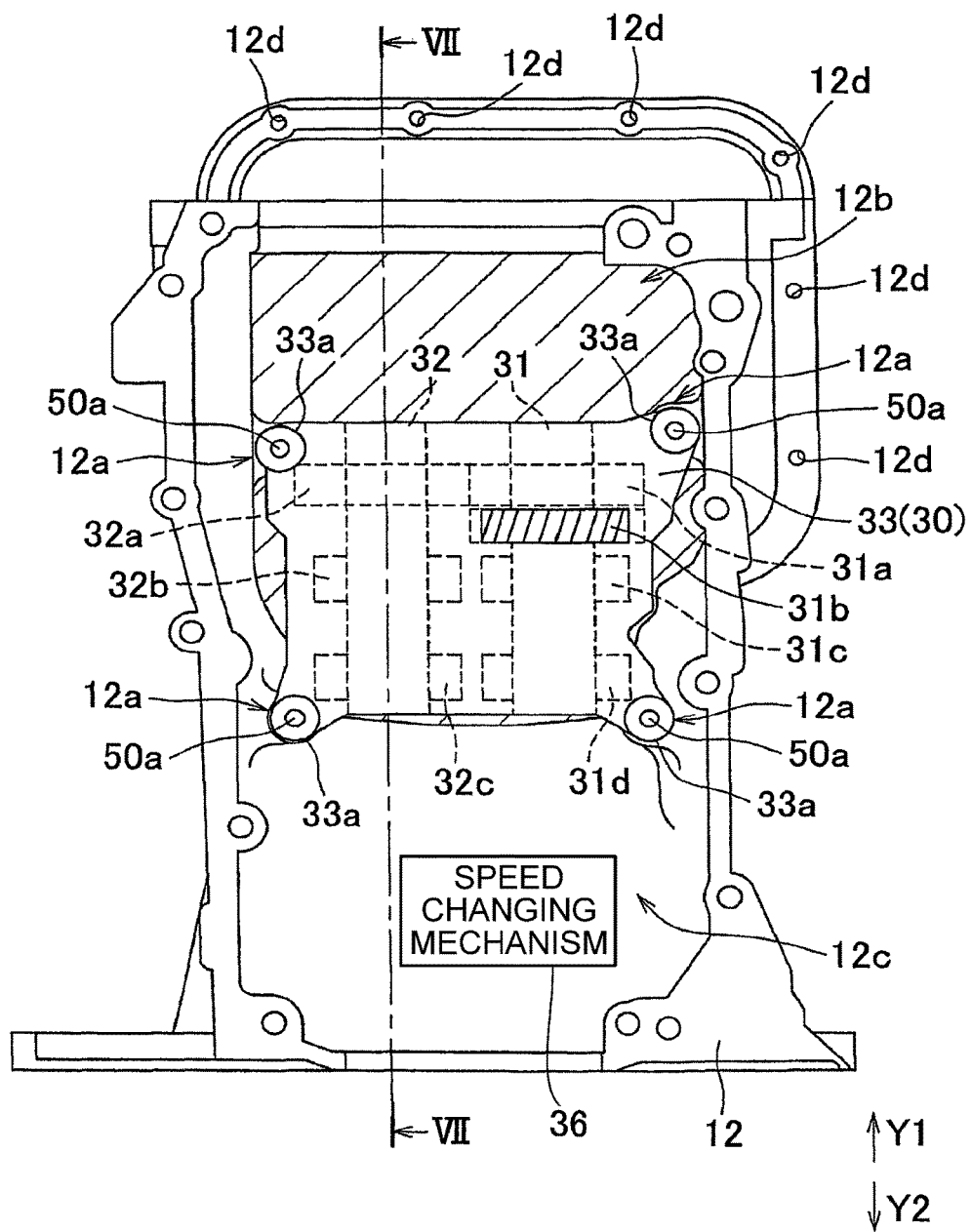
FIG. 3 is a view (top view) in which a crankcase and a balancer device are seen from above.

As shown in FIG. 3, the crankcase 12 has a substantially rectangular shape along the axial direction (Y-direction) of the balance shafts 31, 32 (the crankshaft 17). The balancer device 30 (the balance shaft housing 33) is attached to the crankcase 12.

In addition, the crankcase 12 is provided with four housing side fastening sections 12a. The balance shaft housing 33 is attached to the housing side fastening sections 12a. More specifically, an attachment hole 33a is formed in the vicinity of each of four corners of the balance shaft housing 33. The balance shaft housing 33 is fastened to the housing side fastening sections 12a of the crankcase 12 by inserting a bolt 50a in each of the attachment holes 33a.

Figure 4:
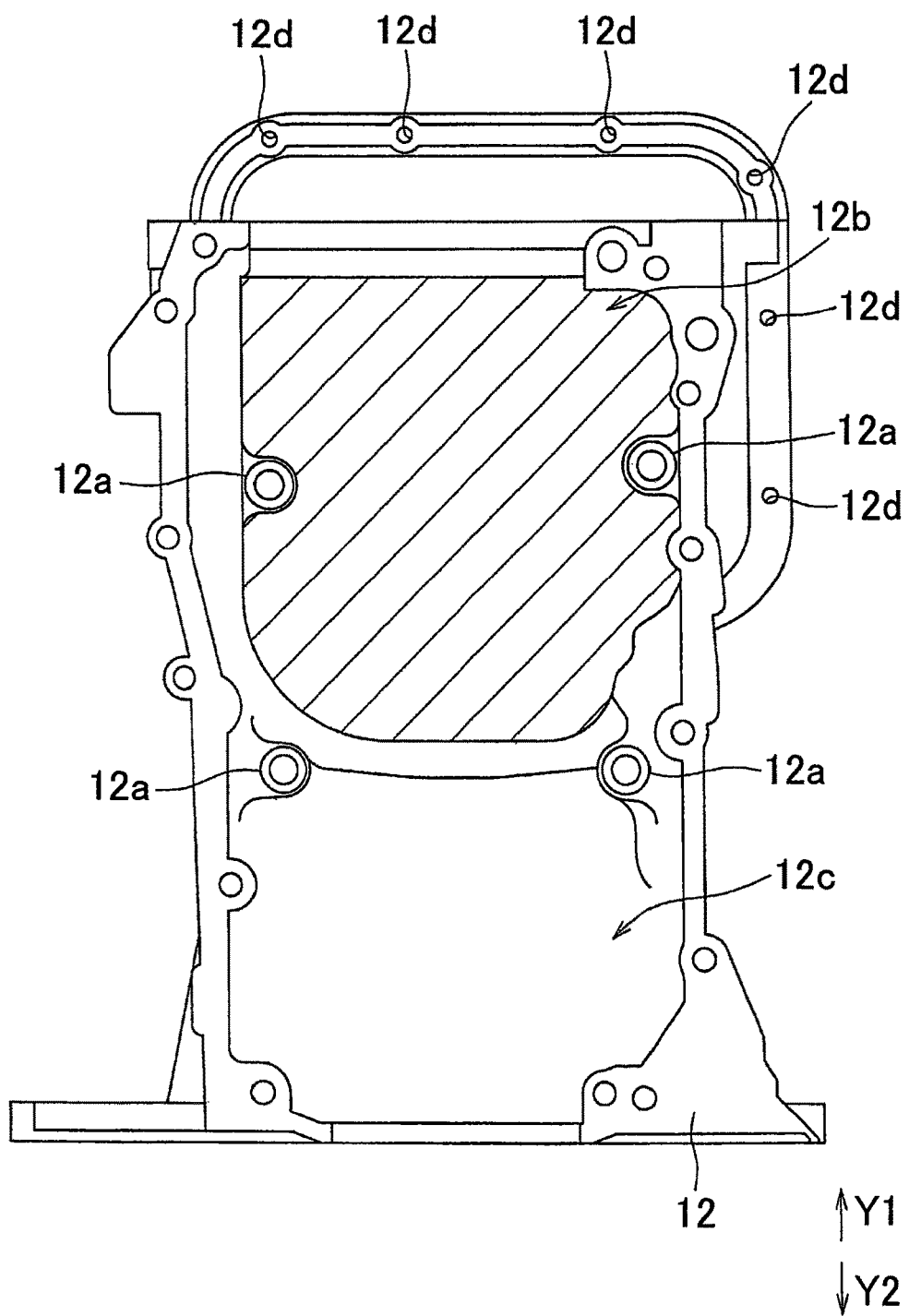
FIG. 4 is a top view in which the balancer device is removed from the crankcase.

As shown in FIG. 4, an opening 12b (shaded area) is formed in a bottom surface of the crankcase 12. The opening 12b has a substantially rectangular shape along the axial direction (Y-direction) of the balance shafts 31, 32 (the crankshaft 17). The opening 12b is formed to extend from the vicinity of a center of the crankcase 12 to an end side (an arrow Y1-direction side) of the crankcase 12. Accordingly, the crankcase 12 has the opening 12b in one side and a closed bottom section 12c in the other side (an arrow Y2-direction side). While the timing chain 25 (see FIG. 1), a chain cover (not shown), and the like are provided in an area of the opening 12b side of the crankcase 12, a speed changing mechanism 36 such as a transmission is provided in an area of the closed bottom section 12c side.

As shown in FIG. 3, two of the four housing side fastening sections 12a in the balance shaft housing 33 are disposed above the opening 12b. The other two of the four housing side fastening sections 12a are disposed in the closed bottom section 12c. Accordingly, the opening 12b of the crankcase 12 is partially covered (closed) by the balance shaft housing 33 in a state where the balancer device 30 (the balance shaft housing 33) is attached to the crankcase 12. In addition, both longer sides of the crankcase 12 are connected to each other by the balance shaft housing 33.

Figure 5:
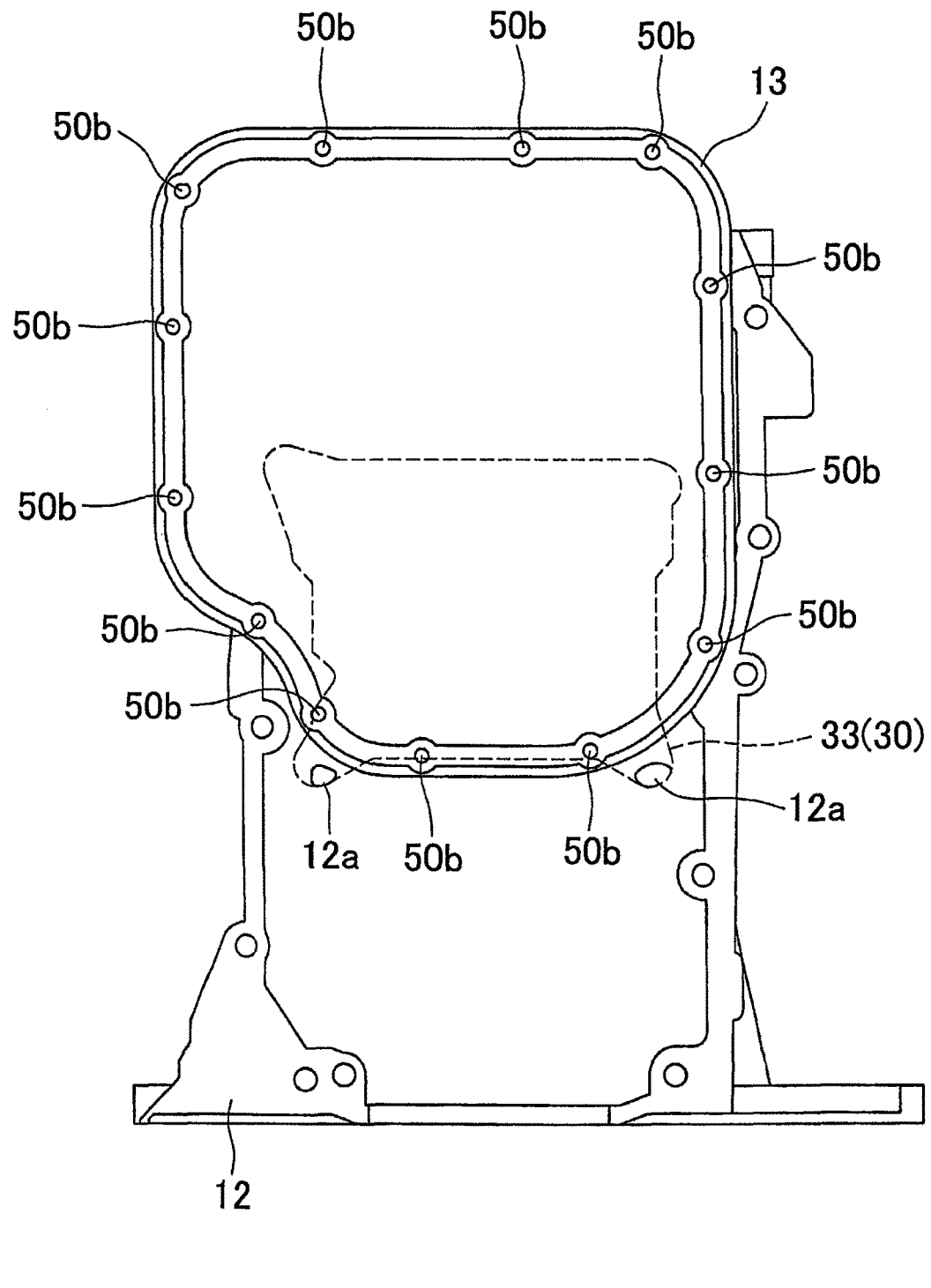
FIG. 5 is a view (bottom view) in which the crankcase and an oil pan are seen from below.

As shown in FIG. 5, the oil pan 13 that is attached to the lower part of the crankcase 12 is attached to an area that is in the arrow Y1-direction side with respect to the center of the crankcase 12 when seen from below. In addition, the oil pan 13 is attached to the lower part of the crankcase 12 by plural bolts 50b (13 in this embodiment).

Figure 6:
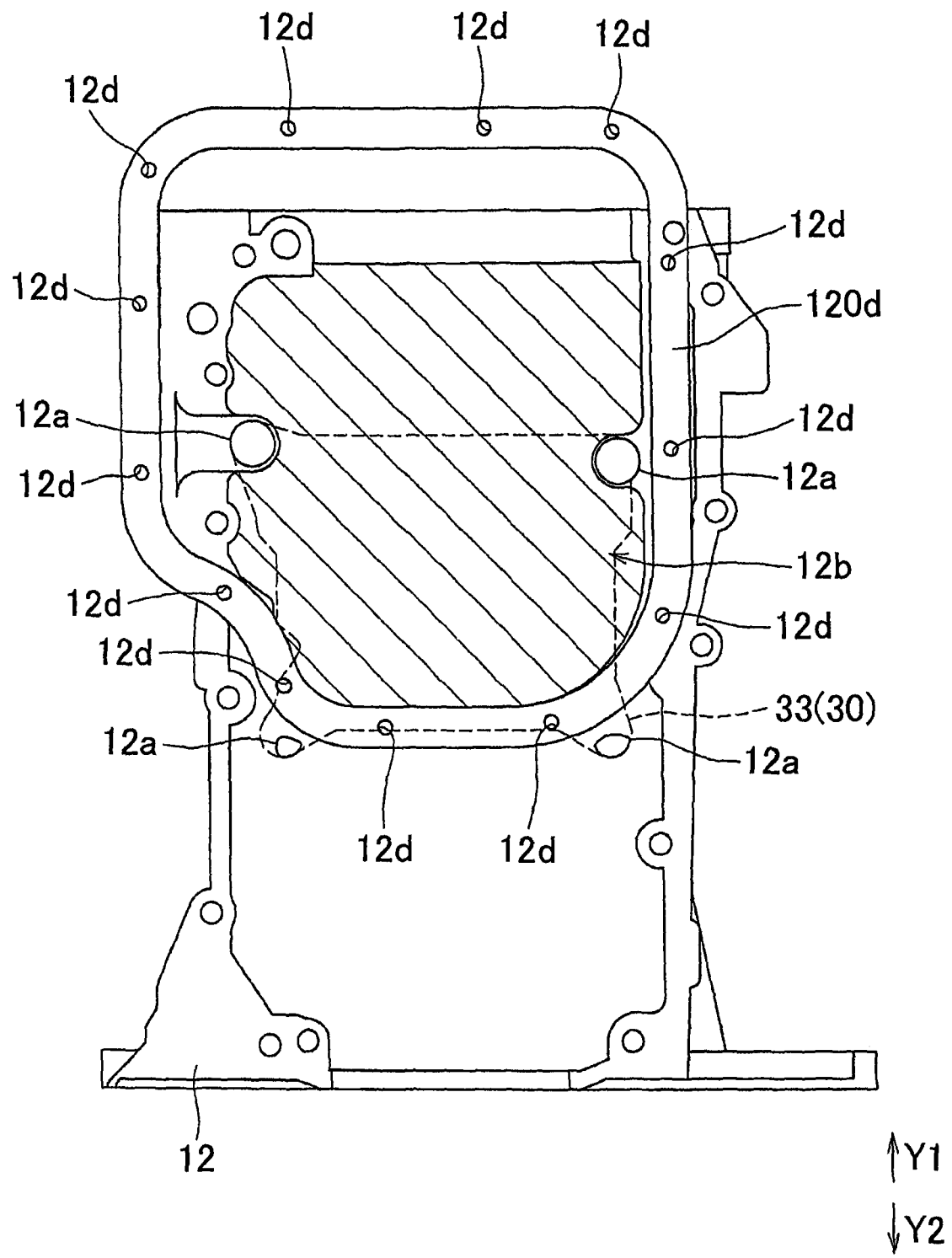
FIG. 6 is a bottom view in which the oil pan and the balancer device are removed from the crankcase.

As shown in FIG. 6, the crankcase 12 is formed with plural fastening sections (fastening holes) 12d (13 holes in this embodiment). A fastening area 120d where the oil pan 13 and the crankcase 12 are fastened to each other is configured by the plural fastening sections 12d. In other words, a surface where the crankcase 12 meets the oil pan 13 serves as the fastening area 120d. The fastening area 120d has a substantially quadrangular shape to surround the opening 12b (shaded area) of the crankcase 12. It should be noted that the shape of the fastening area 120d is not limited to the substantially quadrangular shape but may be a square shape, a rectangular shape, a triangular shape, an annular shape, or the like. Here, the fastening area 120d is an example of an "oil pan side fastening area" of the present invention.

In this embodiment, as shown in FIG. 3 and FIG. 6, two of the four housing side fastening sections 12a of the balance shaft housing 33 in a side where the timing chain 25 is disposed (the arrow Y1-direction side) are disposed on the inside of the fastening area 120d in a plan view. Meanwhile, the other two of the four housing side fastening sections 12a of the balance shaft housing 33 in a side where the speed changing mechanism 36 such as the transmission is disposed (the arrow Y2-direction side) are disposed on the outside of the fastening area 120d in the plan view. The four housing side fastening sections 12a of the balance shaft housing 33 are disposed in the vicinity of the fastening area 120d (the surface where the crankcase 12 meets the oil pan 13).

Figure 8:
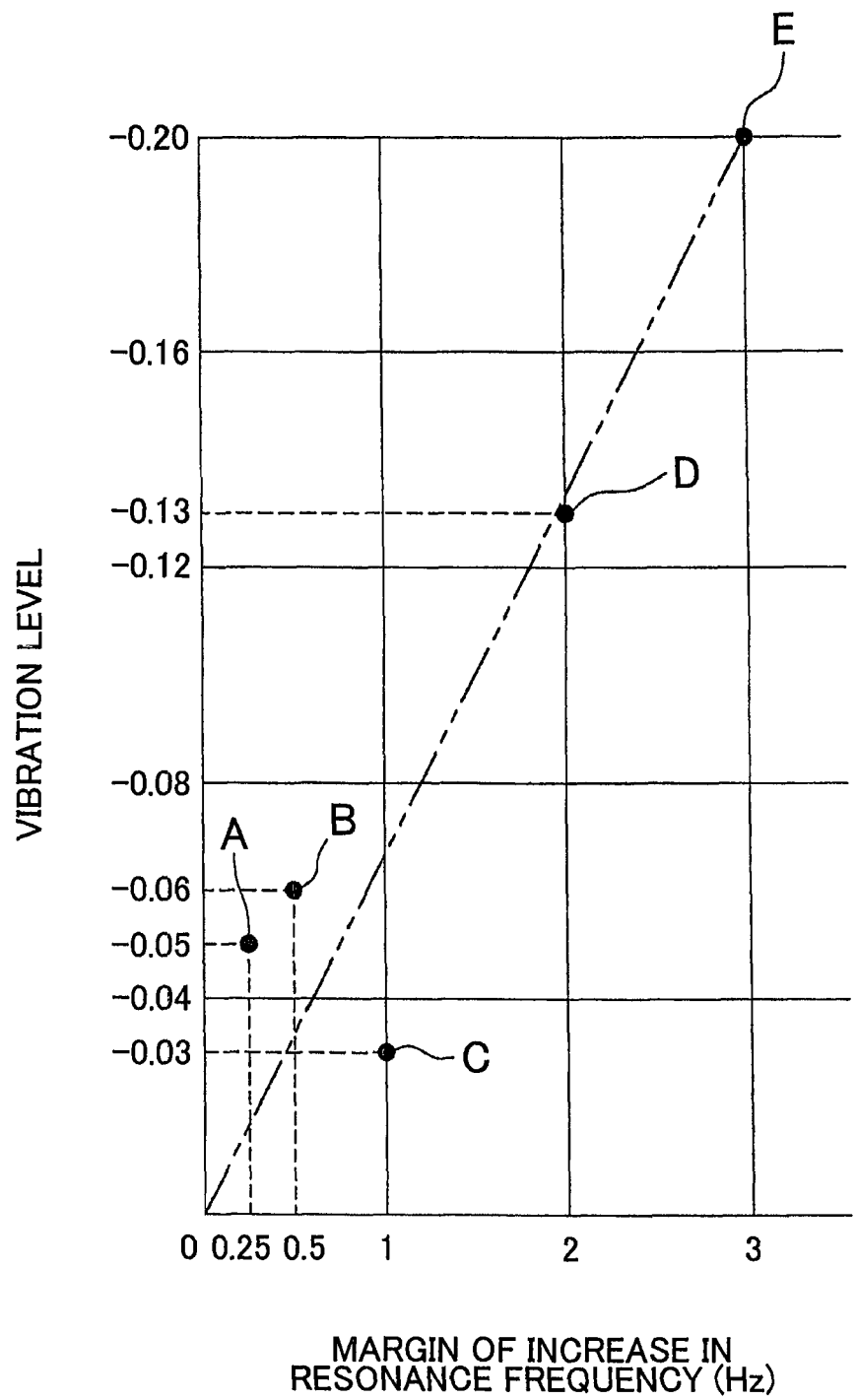
FIG. 8 is a graph for explaining an effect of increasing rigidity of a power plant.

Next, a description is made on an effect to increase the rigidity of a power plant (the engine and the transmission) in this embodiment with reference to FIG. 8.

A horizontal axis in FIG. 8 indicates a margin of increase in a resonance frequency (Hz), and, that is, indicates an increase in the frequency when the power plant that includes the engine of this embodiment is compared to a power plant with a conventional engine. A vertical axis in FIG. 8 indicates a vibration level, indicates that the vibration is reduced as a value indicated on the vertical axis becomes smaller (in an upper direction of a graph), and also indicates that the vibration is increased as the value indicated on the vertical axis becomes larger (a lower direction of a graph).

An engine as a comparative example that is compared in this experiment adopts a configuration in which four housing side fastening sections of a balancer housing are all disposed on the inside of a fastening area. The engine as the comparative example differs from the engine 100 in which two of the four housing side fastening sections 12a are disposed on the inside of the fastening area 120d and the other two are disposed on the outside of the fastening area 120d.

A result of this experiment shows the margin of increase in the resonance frequency (Hz) and the vibration level that are obtained by driving the five power plants (the engine and the transmission) (power plants A to E), each of which includes the engine 100 in which two of the four housing side fastening sections 12a of the balance shaft housing 33 according to this embodiment are disposed on the inside of the fastening area 120d of the crankcase 12 and the other two are disposed on the outside of the fastening area 120d, under a same condition and comparing the five power plants with the conventional power plant. In the result of the experiment shown in FIG. 8, the margin of increase in the resonance frequency (Hz) and the vibration level that are obtained by driving the conventional power plant are set to 0.

It was understood from the experiment result that the margin of increase in the resonance frequency (Hz) of the power plant A was approximately 0.25 (Hz) and the vibration level thereof was approximately −0.05. It was understood from this result that the rigidity of the power plant A was increased because of the increased margin of increase in the resonance frequency (Hz) and the lowered vibration level compared to the conventional power plant.

It was understood from the experiment result that the margin of increase in the resonance frequency (Hz) of the power plant B was approximately 0.5 (Hz) and the vibration level thereof was approximately −0.06. It was understood from this result that the rigidity of the power plant B was increased because of the increased margin of increase in the resonance frequency (Hz) and the lowered vibration level compared to the conventional power plant.

It was understood from the experiment result that the margin of increase in the resonance frequency (Hz) of the power plant C was approximately 1.0 (Hz) and the vibration level thereof was approximately −0.03. It was understood from this result that the rigidity of the power plant C was increased because of the increased margin of increase in the resonance frequency (Hz) and the lowered vibration level compared to the conventional power plant.

It was understood from the experiment result that the margin of increase in the resonance frequency (Hz) of the power plant D was approximately 2.0 (Hz) and the vibration level thereof was approximately −0.13. It was understood from this result that the rigidity of the power plant D was increased because of the increased margin of increase in the resonance frequency (Hz) and the lowered vibration level compared to the conventional power plant.

It was understood from the experiment result that the margin of increase in the resonance frequency (Hz) of the power plant E was approximately 3.0 (Hz) and the vibration level thereof was approximately −0.20. It was understood from this result that the rigidity of the power plant E was increased because of the increased margin of increase in the resonance frequency (Hz) and the lowered vibration level compared to the conventional power plant.

It was identified that the rigidity of the five power plants A to E (the engine and the transmission), each of which included the engine 100 of this embodiment, could be increased when compared to the conventional power plant. It was also identified that the margin of increase in the resonance frequency (Hz) increased proportionally to the improvement of the vibration level in the power plant of this embodiment as shown in a two-dot chain line of the experiment result in FIG. 8.

According to the engine 100 of this embodiment, which has been described so far, following effects can be obtained.

In this embodiment, as described above, two of the four housing side fastening sections 12a in the axial side where the timing chain 25 is disposed (in the arrow Y1-direction side) are disposed on the inside of the fastening area 120d, and the other two of the four housing side fastening sections 12a in the axial side where the speed changing mechanism 36 is disposed (in the arrow Y2-direction side) are disposed on the outside of the fastening area 120d (in the closed bottom section 12c) where the crankcase 12 and the oil pan 13 are fastened. Accordingly, because the balance shaft housing 33 can have a beam structure in the opening 12b of the crankcase 12, it is possible to suppress twisting, bending, or the like of the crankcase 12 that can be caused by the opening 12b. In other words, because the resonance frequency is increased (improved) in the power plant by optimally disposing the balance shaft housing 33, the rigidity of the power plant can be increased with the increase in the resonance frequency. Therefore, it is possible to reduce the vibration of the engine mount and also reduce the engine noise. In addition, the rigidity of the power plant is increased by optimally disposing the balance shaft housing 33. Therefore, unlike a case where a rib or the like is disposed in the crankcase 12 for reinforcement (increased rigidity), it is possible to suppress an increase in a mass of the crankcase 12. Furthermore, the rigidity of the power plant can be increased and a fastening space for attaching a drive plate and the like of the speed changing mechanism 36 can be secured in the axial end side of the crankcase 12 where the speed changing mechanism 36 is disposed (in the arrow Y2-direction side).

In this embodiment, as described above, the two fastening sections 12a of the four housing side fastening sections 12a in the axial side where the timing chain 25 is disposed (in the arrow Y1-direction side) are disposed on the inside of the fastening area 120d, and the other two fastening sections 12a of the four housing side fastening sections 12a in the axial side where the speed changing mechanism 36 is disposed (the arrow Y2-direction side) are disposed on the outside of the fastening area 120d (in the closed bottom section 12c). Accordingly, because the balance shaft housing 33 can be disposed to extend from the inside to the outside of the fastening area 120d (the opening 12b), it is possible to suppress occurrence of twisting, bending, or the like of the opening 12b. Therefore, the rigidity of the power plant can be increased.

In this embodiment, as described above, the two fastening sections 12a of the four housing side fastening sections 12a in the axial side where the timing chain 25 is disposed (in the arrow Y1-direction side) may be disposed on the inside of the fastening area 120d and in the vicinity of the fastening area 120d, and the other two fastening sections 12a of the four housing side fastening sections 12a in the axial side where the speed changing mechanism 36 is disposed (the arrow Y2-direction side) may be disposed on the outside of the fastening area 120d and in the vicinity of the fastening area 120d.

In this embodiment, as described above, the opening 12b of the crankcase 12 is formed to extend from the vicinity of the center of the crankcase 12 to the axial end side where the timing chain 25 is disposed (the arrow Y1-direction side). Accordingly, it is possible to suppress occurrence of twisting, bending, or the like of the opening 12b that is formed to extend from the vicinity of the center of the crankcase 12 to the axial end side where the timing chain 25 is disposed (the arrow Y1-direction side). Therefore, the rigidity of the power plant can be increased.

Another embodiment—The embodiment of the disclosure should be considered in all respects as illustrative and not restrictive. The scope of the present invention is indicated by the appended claims rather than the foregoing description of the embodiment, and all changes which come within the meaning and range of equivalents of the appended claims are intended to be embraced therein.

For example, the above embodiment shows an example in which a crankcase and a balance shaft housing are fastened by four housing side fastening sections. However, the present invention is not limited thereto. For example, the crankcase and the balance shaft housing may be fastened by the five or more fastening sections. In this case, the rigidity of the power plant can also be increased.

The present invention can be utilized for an internal combustion engine, and in particular for an internal combustion engine including a balance shaft housing that is disposed between a crankcase and an oil pan and that is provided with a balance shaft in a rotatable manner.

The invention claimed is:

1. An internal combustion engine comprising:
   an oil pan;
   a crankcase formed with an opening that communicates between the crankcase and the oil pan, the crankcase being provided with an oil pan side fastening area that surrounds the opening and contacts the oil pan, the crankcase having a first side and a second side facing each other in a direction perpendicular to an axis of a balance shaft at the oil pan side fastening area when viewed in a top plan view of the crankcase, the first side and the second side of the crankcase each extending in a direction of the axis of the balance shaft; and a balance shaft housing disposed between the oil pan and the crankcase to cover the opening, the first side and the second side of the crankcase being connected to each other by the balance shaft housing, wherein:
    the crankcase is provided with a plurality of housing side fastening sections that fasten the crankcase and the balance shaft housing, the plurality of housing side fastening sections including at least a first fastening section and a second fastening section;
    the first fastening section is disposed at a first axial direction side of the balance shaft that is disposed on an inside of the oil pan side fastening area within the opening of the crankcase; and
    the second fastening section of the plurality of housing side fastening sections is disposed at a second axial direction side of the balance shaft, the second axial direction side of the balance shaft being opposite from the first axial direction side, the second fastening section being disposed on an outside of the oil pan side fastening area and disposed outside of the opening of the crankcase.

2. The internal combustion engine according to claim 1, wherein:
    the oil pan side fastening area has a shape in order to surround the opening of the crankcase;
    the first fastening section of the plurality of housing side fastening sections is disposed on the inside of the oil pan side fastening area that has the shape to surround the opening; and
    the second fastening section of the plurality of housing side fastening sections is disposed on the outside of the oil pan side fastening area that has the shape to surround the opening.

3. The internal combustion engine according to claim 1, wherein:
    the first fastening section of the plurality of housing side fastening sections is disposed on the inside of the oil pan side fastening area and in a vicinity of the oil pan side fastening area; and
    the second fastening section of the plurality of housing side fastening sections is disposed on the outside of the oil pan side fastening area and in the vicinity of the oil pan side fastening area.

4. The internal combustion engine according to claim 1, wherein the opening of the crankcase is formed to extend from a vicinity of a center of the crankcase to an end of the crankcase in the first axial direction side of the balance shaft.

5. The internal combustion engine according to claim 1, wherein:
    a speed changing mechanism is disposed in the second axial direction side in the crankcase;
    the first fastening section of the plurality of housing side fastening sections on an opposite side from the second axial direction side, where the speed changing mechanism is disposed, is disposed on the inside of the oil pan side fastening area; and
    the second fastening section of the plurality of housing side fastening sections in the second axial direction side, where the speed changing mechanism is disposed, is disposed on the outside of the oil pan side fastening area.

* * * * *